United States Patent [19]

Takahashi et al.

[11] 4,262,475

[45] Apr. 21, 1981

[54] METHOD AND APPARATUS FOR COLLECTING GRASS CLIPPINGS

[75] Inventors: Katsuhiko Takahashi, Tokorozawa; Hachiro Doi, Saitama; Masayuki Yaegashi, Kiyose, all of Japan

[73] Assignee: Fuso Keigokin Co., Ltd., Tokyo, Japan

[21] Appl. No.: 20,667

[22] Filed: Mar. 15, 1979

[30] Foreign Application Priority Data

Apr. 28, 1978 [JP] Japan .................................. 53-52585

[51] Int. Cl.³ ...................... A01D 61/02; A01D 53/04
[52] U.S. Cl. ...................................... 56/16.6; 56/157; 56/202
[58] Field of Search ................ 56/16.6, 202, 157, 184, 56/153, 11.4, 10.8

[56] References Cited

U.S. PATENT DOCUMENTS

| | | | |
|---|---|---|---|
| 875,831 | 1/1908 | Longstreet | 56/184 |
| 1,119,898 | 12/1914 | Tufty et al. | 56/184 |
| 1,591,775 | 7/1926 | Perling | 56/157 |
| 3,222,853 | 12/1965 | Michael | 56/16.6 |
| 3,736,736 | 6/1973 | Myers | 56/16.6 |
| 3,805,500 | 7/1972 | Sweet | 56/202 |
| 3,987,606 | 10/1976 | Evans | 56/202 |
| 4,054,023 | 10/1977 | Carpenter | 56/202 |
| 4,095,398 | 7/1978 | Aumann et al. | 56/16.6 |
| 4,151,702 | 5/1979 | Brown | 56/16.6 |
| 4,168,600 | 9/1979 | Klug et al. | 56/16.6 |

FOREIGN PATENT DOCUMENTS 540622  7/1922  France ...................... 56/16.6

*Primary Examiner*—Paul J. Hirsch
*Attorney, Agent, or Firm*—Birch, Stewart, Kolasch & Birch

[57] ABSTRACT

The present invention is directed to an apparatus and method for collecting the discharged grass clippings of a lawn mower. The lawn mower includes a discharge opening at the lateral side or the rear side of the lawn mower. Grass clippings are directed through the discharge opening to a conveyor member, thereafter the clippings are deposited in a catcher. The present invention does not require a high speed air flow to discharge the grass clippings. Further, since the grass clippings are discharged by a conveyor member into the top opening of a catcher the level of grass clippings positioned in the catcher may readily be observed so that it is very easy to determine when the catcher should be emptied.

15 Claims, 7 Drawing Figures

METHOD AND APPARATUS FOR COLLECTING GRASS CLIPPINGS

BACKGROUND OF THE INVENTION

1. Filed of the Invention

The present invention relates to an apparatus and method for collecting grass clippings by a lawn mower without scattering the grass clippings.

2. Brief Description of the Prior Art

Lawn mowers are known in the prior art which are provided with a receiving box or bag into which the lawn clippings are blown and collected with the help of a high speed air flow produced by the rotational movement of the cutting blade of the lawn mower. These prior art lawn mowers experience difficulty in depositing the grass clippings into the receiving box or bag.

To overcome the difficulty in depositing the grass clippings in the receiving box or bag it has been proposed in the prior art to rotate the cutting blade at a higher speed than that necessary for mowing the lawn. Further, it has been proposed to partially bend the cutting blade or to provide a special fan plate to increase the production of high speed air flow. In addition, it has been proposed to provide the lawn mower on its inner periphery with a special wind tunnel to produce a high speed air flow. However, even if discharging the grass clippings under the influence of a high speed air flow there is a tendency for the grass clippings to stick to an outlet of the lawn mower or to an inlet of the receiving box or bag. The adhering of the grass clippings to various elements of the lawn mower is increased when the grass clippings are wet with rain or dew. Further, the adhering of the grass clippings results in a clogging of the outlet of the lawn mower or the inlet of the receiving box or bag soon after the start of the mowing operation.

Operating a lawn mower at a high speed to produce a high speed air flow considerably decreases the life expectancy of the lawn mower. Further, this high operational speed often results in damage to the lawn mower. In addition, the energy consumption, namely, electrical power consumption or gasoline consumption, is increased by operating the lawn mower at a high speed. Still further, this high operational speed is dangerous and results in an increase in noise.

Another disadvantage of the prior art lawn mowers is that the high speed air flow throws pebbles and other debris together with the grass clippings outwardly from beneath the lawn mower. Therefore, to decrease the danger of the debris from striking an operator the receiving box or bag is usually positioned to one side of the lawn mower. However, this arrangement remarkably decreases the mobility and the working performance of the lawn mower.

SUMMARY OF THE INVENTION

It is an object of the present invention to provide a lawn mower which is designed to discharge even wet grass clippings from a discharge opening without utilizing a high speed air flow. The grass clippings are received by a conveyor member which is provided adjacent to the lawn mower which deposits the grass clippings into a catcher box or bag.

Another object of the present invention is to provide a relatively simple apparatus for collecting the grass clippings which can be easily manufactured and assembled. The conveyor member for collecting and conveying the grass clippings and a catcher for receiving the grass clippings are detachably and conviently mounted to the lawn mower to increase the mobility of the lawn mower.

A further object of the present invention is to provide an apparatus for collecting grass clippings wherein the catcher can be mounted to either the lateral side or the rear side of the lawn mower without decreasing the performance of the mower and without involving any danger to the operator.

A still further object of the present invention is to provide a collecting apparatus for a lawn mower wherein the quantity of collected grass clippings can be easily observed at a glance.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
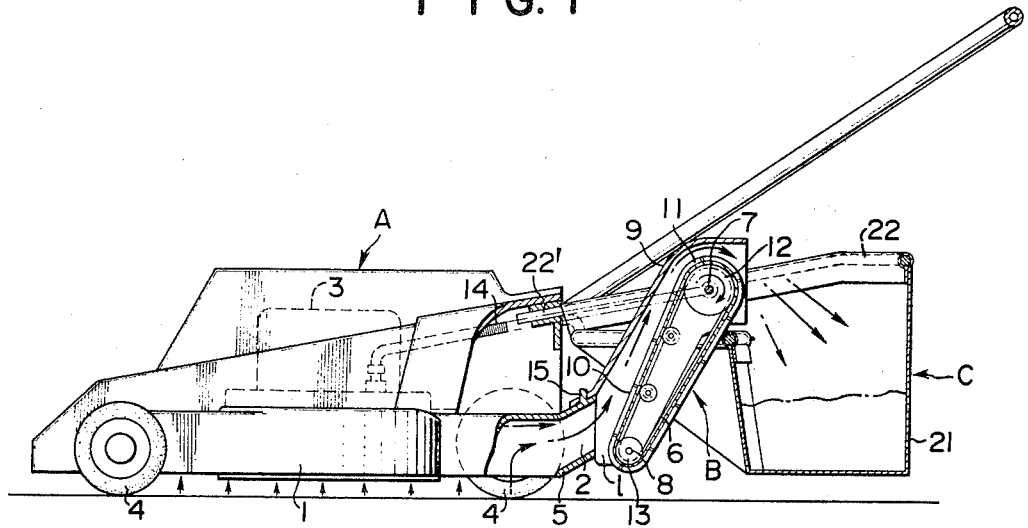
FIG. 1 is a partially broken side elevational view of a first embodiment of the present invention.
Figure 2:
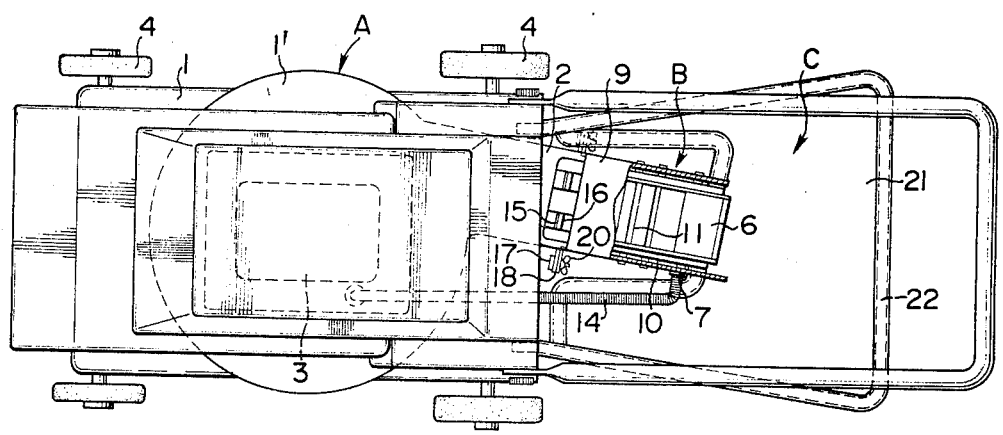
FIG. 2 is a partially broken plan view of FIG. 1.
Figure 3:
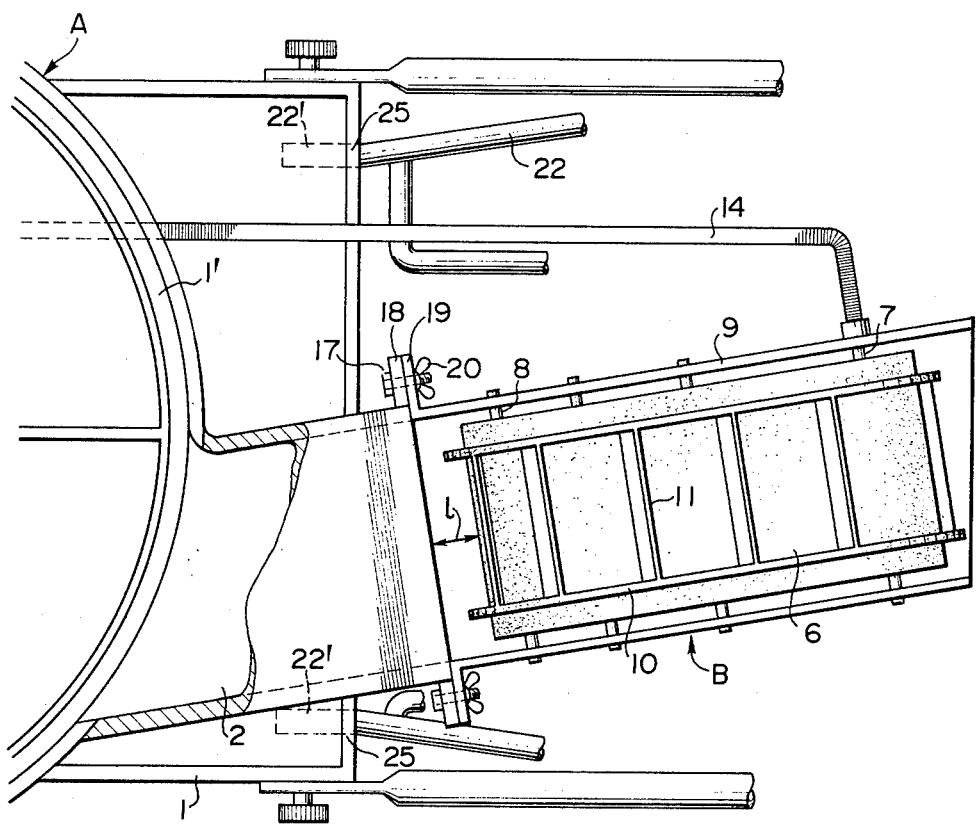
FIG. 3 is a partially broken enlarged bottom view of FIG. 1.

As illustrated in FIGS. 1–7, a lawn mower A includes a body frame 1 mounted on a pair of front wheels and a pair of rear wheels generally indicated by character 4. The bottom portion of the lawn mower is open and is designed to receive a cutting blade (not shown in the drawings). An electrical motor or engine 3 is mounted on the body frame 1 and includes a drive shaft which rotates the cutting blade. This particular type of lawn mower is commonly referred to as a rotary lawn mower. The frame portion 1' of the body frame 1 is cylindrical in shape and surrounds the cutting blade so that the grass clippings can be easily thrown outwardly from beneath the lawn mower into a discharge opening 2 with the help of the rotation of the cutting blade.

The discharge opening 2 is provided on the lateral side or the rear side of the lawn mower A and is connected to the inner periphery of the cylindrical frame portion 1' in such a way that the discharge opening extends in a tangential direction to the direction of the rotational movement of the cutting blade, in other words, the discharge opening extends in a tangential direction to the cylindrical shape of the frame portion 1'. A guide plate 5 is positioned at the lower portion of the discharge opening 2 and ensures the passage of grass clippings onto a conveyor member B. Due to the positioning of the discharge opening 2 which extends in a tangential direction to the rotating cutting blade, the grass clippings can be automatically thrown onto the conveyor member B with the help of the rotational movement of the cutting blade.

The conveyor member B includes a conveyor belt 6 disposed between a drive shaft 7 and a rotatable support shaft 8. The drive shaft 7 is designed to rotate the conveyor belt 6 positioned within the support frame 9. The conveyor member B is detachably mounted to the discharge opening 2 of the lawn mower A. The conveyor belt 6 extends between the drive shaft 7 and the support shaft 8 which are parallel to the support frame 9 so that the conveyor belt 6 is rotatably supported by the shafts 7 and 8. The conveyor belt 6 is provided on its outer periphery with spaced cross ribs 11 projecting outwardly from the peripheral surface to prevent the grass clippings from slipping downwardly on the conveyor belt 6 during the conveyance of the grass clippings into the catcher C. Upwardly projecting walls 10 are provided on opposite side edges of the conveyor member B which prevent the grass clippings from falling off the edges of the conveyor belt. As illustrated in the drawings, the drive shaft 7 is attached to a drive pulley 12 and the support shaft 8 is attached to a smaller support pulley 13. The conveyor belt 6 is designed to be rotatably supported within the frame 9 which is generally shaped in cross section as an inverted U-shape. When the conveyor member B is mounted to the lawn mower A, the support shaft 8 is positioned opposite to the discharge opening 2 in such a way that the shaft 8 is spaced a small distance or gap l from the discharge opening 2. The drive shaft 7 is positioned upwardly and outwardly from the support shaft 8. Since the drive pulley 12 has a larger diameter than the support pulley 13 and since the drive pulley 12 is positioned upwardly in the direction of movement of the conveyor belt 6 from the support pulley 13, the conveyor belt 6 can be rotated while always maintaining the tension of the portion of the conveyor belt 6 that conveys the grass clippings thereon. As illustrated in the drawings, the portion of the conveyor belt 6 which carries the grass clippings is disposed adjacent to the support frame 9. The gap l between the conveyor member B and discharge opening 2 is such that twigs or pebbles thrown out from the opening 2 by the cutting blade during the mowing operation fall to the ground from the gap.

The conveyor member B may be driven either together with or independently from the cutting blade of the lawn mower A. In one embodiment of the present invention, the conveyor member B may be driven together with the cutting blade which is rotated by the electric motor or engine 3 by means of a flexible transmission rod 14. The drive shaft 7 of the conveyor member B may be driven by either the electric motor or engine 3 through a flexible transmission rod 14 or by means of a transmission belt.

Figure 4:
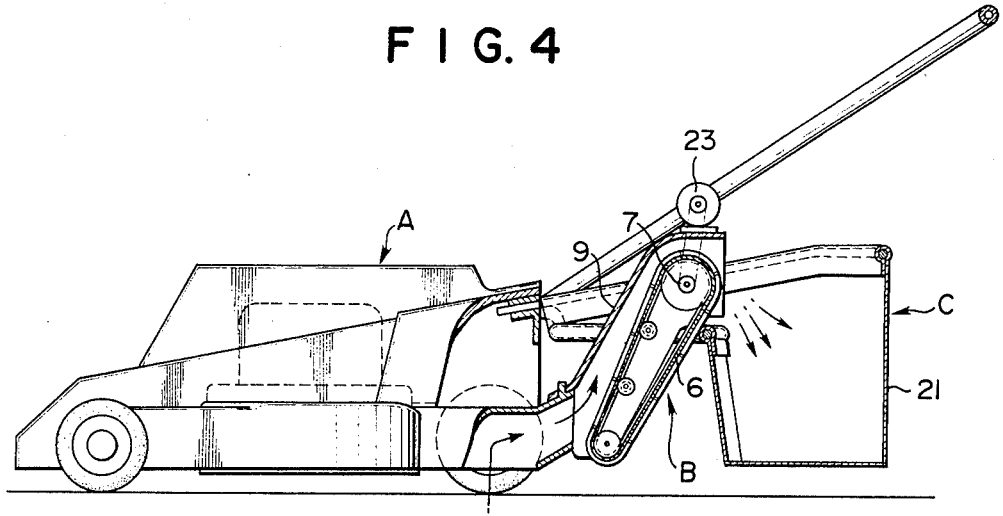
FIG. 4 is a partially broken side elevational view of a second embodiment of the present invention.

In a second embodiment of the present invention, as illustrated in FIG. 4, the conveyor member B may be driven independently of the electric motor or engine 3 by means of a second motor or engine 23. In other words, the drive shaft 7 of the conveyor member B may be independently connected to a second motor or engine 23 for rotating the conveyor belt 6.

The number of revolutions or the drive power supplied to the conveyor belt 6 depends on the mowing power of the lawn mower A, the angle of inclination of the conveyor belt and other factors. Generally, the number of revolutions of the conveyor belt 6 is quite small.

The conveyor member B is designed to be easily detachably mounted to the discharge opening. Projections 15 are provided on the upper wall which project from the lawn mower A adjacent to the discharge opening 2. Engaging holes 16 are provided in the support frame 9 which mate with the projections 15 to hold the conveyor member B on the body frame 1. Further, the side walls which define the discharge opening 2 are provided with abutment projections 18. The conveyor member B is provided with flanges 19 projecting from the support frame 9 which are designed to mate with the abutment projections 18. Bolts 17 may be inserted through the abutment projections 18 and the flanges 19 to secure the conveyor member B relative to the body frame 1.

When the holes 16 of the conveyor member B are inserted over the projections 15 of the lawn mower A and when the abutment projections 18 contact the flanges 19, the conveyor member B is latched on the discharge opening 2 by the weight of the conveyor member. Thereafter, the bolts 17 of the abutment projections 18 are engaged by respective wing nuts 20 to fasten the projections 18 to the flanges 19 so that the conveyor member B is securely fastened to the lawn mower A. Similarly, when the wing nuts 20 are disengaged from the bolts 17, the conveyor member B may be easily removed from the lawn mower A.

Figure 5:
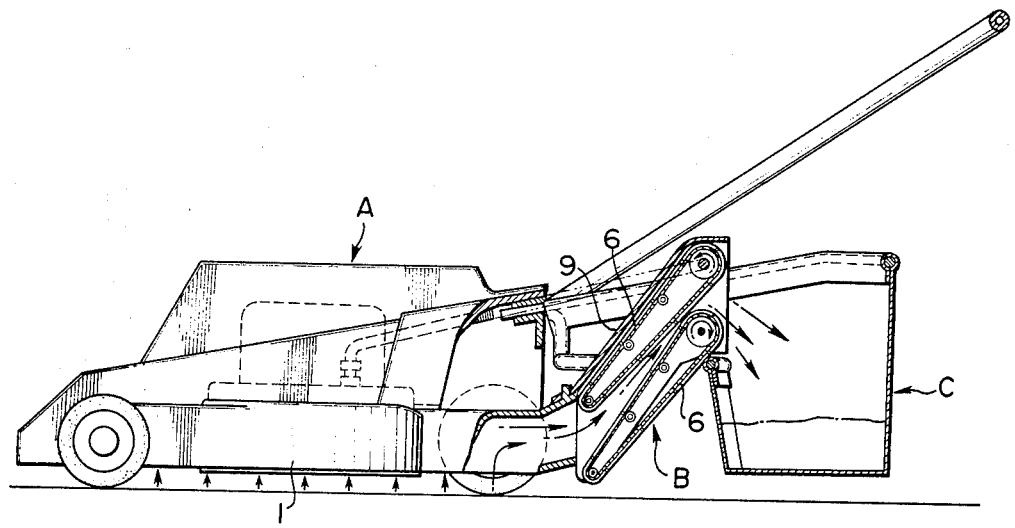
FIG. 5 is a partially broken side elevational view of a third embodiment of the present invention.

Another embodiment of the present invention is illustrated in FIG. 5. The conveyor member B includes two generally parallel conveyor belts 6, 6 which are rotatably supported by the support frame 9. According to this embodiment of the present invention, grass clippings discharged from the discharge opening 2 are conveyed upwardly while being held between the two conveyor belts 6, 6. In this manner, grass clippings do not slip down the conveyor belts and are therefore reliably conveyed to the catcher C. In addition, according to this embodiment of the present invention, bulky grass clippings can be crushed and conveyed by the conveyor belts 6, 6. The catcher C is in the form of a container, such as a box or bag, which includes an open top. The open top may be covered with a cover cap if necessary. The catcher C is positioned behind and below the conveyor member B and is detachably mounted to the lawn mower A independently of the conveyor member B. The catcher C is provided with a frame 22 and includes two side members 22', 22' which engage the lawn mower A and project outwardly therefrom. The projecting side poritions 22', 22' are inserted into the respective holes 25, 25 formed in the rear portion of the lawn mower A to mount the catcher C to the lawn mower.

The catcher C can be wholly constructed of metal or hard synthetic resin material. Alternatively, the catcher C may consist of a separate support frame 22 and a receiving portion 21 which is made of a flexible cloth or synthetic resin material and which is mounted to the support frame 22. In one embodiment of the present invention, the receiving portion 21 may be constructed of an inexpensive material which is detachably mounted to the support frame 22. In this embodiment of the present invention, the receiving portion 21 may be discarded together with the grass clippings after mowing the lawn.

Figure 6:
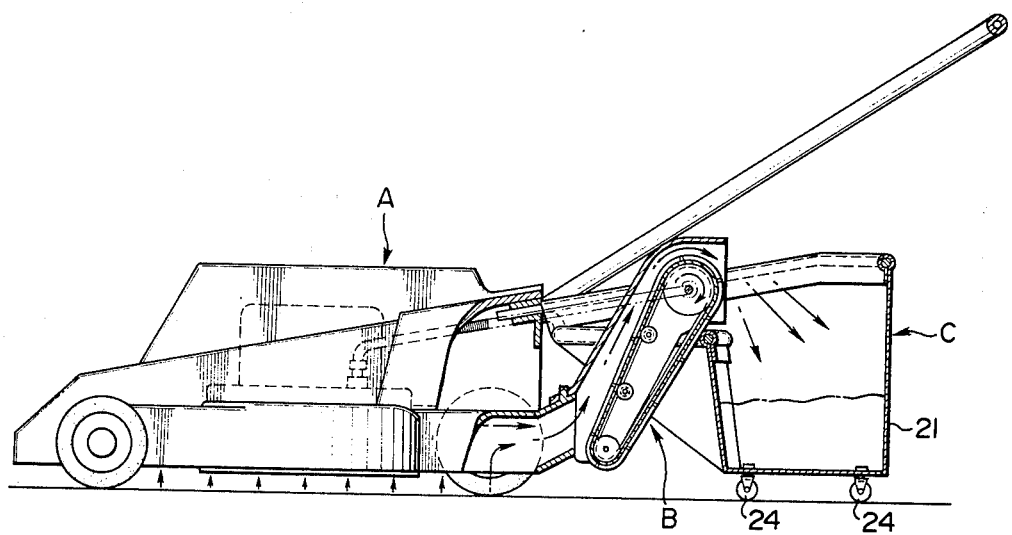
FIG. 6 is a partially broken side elevational view of a fourth embodiment of the present invention.

A further embodiment of the present invention is illustrated in FIG. 6. The lower portion of the catcher C is provided with rollers or carriers 24 to decrease the load exerted on the frame 22 of the catcher C. Further, the rollers or carriers 24 will tend to decrease the load exerted on the rear portion of the lawn mower A. It should be readily understood that the catcher C provided with the rollers or carriers 24 may be detachably connected to the rear portion of the conveyor member B.

The lawn mower of the present invention discharges grass clippings from the discharge opening and conveys them upwardly by means of the conveyor member B to deposit the grass clippings in the catcher C. In this manner, grass clippings are successively thrown and collected in the catcher C in a reliable and complete manner even if the grass clippings are wet. The grass clippings are conveyed and collected in the catcher C without the aid of a high speed air flow. Accordingly, there is no possibility that the discharge opening and/or the inlet opening of the catcher will become clogged with the grass clippings. Further, since the grass clippings may be ejected, conveyed and collected without the help of a high speed air flow, no special device for creating the high speed air flow is necessary. Therefore, the cutting blade can be economically rotated at a slow speed which is sufficient to sever the grass clippings, thus resulting in a savings in power and a decrease in the noise level. Further, even when the catcher C is mounted to the rear of the lawn mower, the operator can comfortably operate the mower without the necessity of creating a high speed air flow.

Figure 7:
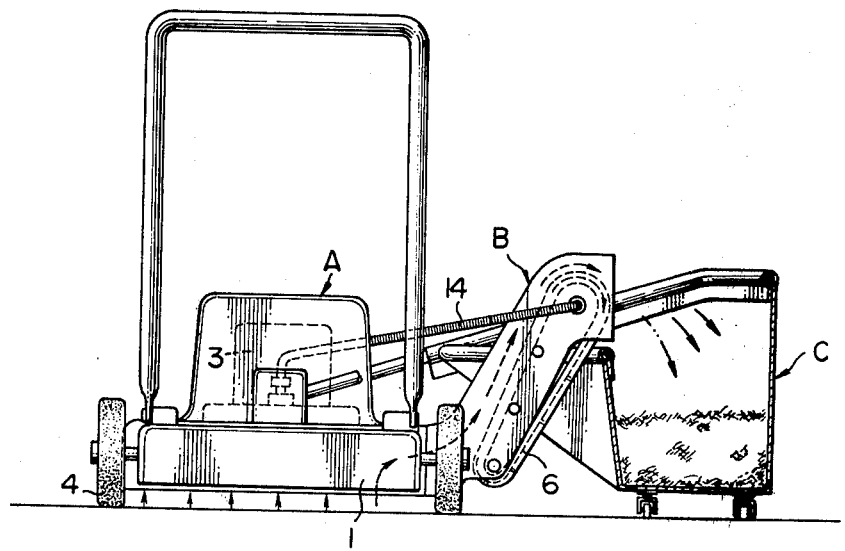
FIG. 7 is a partially broken rear elevational view of an embodiment of the present invention wherein the catcher is mounted to a lateral side of the lawn mower.

FIG. 7 illustrates another embodiment of the invention wherein the catcher C is mounted on a lateral side of the lawn mower A. The elements disclosed in this embodiment of the invention are substantially similar to and operate in the same manner as the elements illustrated in FIGS. 1-3 and 6 of the drawings. However, the conveyor member B, as illustrated in FIG. 7, is mounted on the right, lateral side of the lawn mower instead of to the rear. In addition, it will be readily apparent to one with ordinary skill in this art that the conveyor member B and the catcher C could be just as readily connected to the left, lateral side of the lawn mower A. Further, although this embodiment of the invention includes rollers or carriers positioned on the bottom member of the catcher C, the catcher C may be attached directly to the lawn mower A without the use of rollers or carriers.

As illustrated in the drawings, the apparatus of the present invention is relatively simple in construction. Since the conveyor member B is provided at the discharge opening to collect and convey the grass clippings, the conveyor member of the present invention may be easily adapted to conventional lawn mowers. Further, even if pebbles and/or twigs are thrown from the discharge opening by the cutting blade during the mowing operation, they are received by the conveyor member and fall to the ground through a gap between the conveyor member and the discharge opening.

The arrangement of the present invention whereby the conveyor member is positioned adjacent to the rear or lateral side of a lawn mower has no harmful effect on the working performance of the lawn mower and creates no danger in the mowing operation. The advantages of the present invention are a direct result of the fact that a high speed air flow is not utilized in the apparatus of the present invention. In addition, the lawn mower of the present invention will completely collect the grass clippings even if the lawn mower is utilized to mow the lawn on a corner, an edge, or the like of a garden. Further, by employing a conveyor member which is positioned at the discharge opening to collect the grass clippings and to convey the same into a catcher, which includes an open top, the collection of grass clippings can be easily and conveniently effected and the quantity of the grass clippings can always be easily observed at a glance. Because the conveyor member for collecting and conveying the grass clippings and the catcher for receiving the grass clippings are detachably connected to the lawn mower, the apparatus of the present invention can be compactly stored and easily transported and handled. Further, due to the interconnection between the conveyor member and the cutting blade of the lawn mower, no special drive mechanism for driving the conveyor member is necessary. This arrangement contributes to the decrease in the manufacturing costs of the apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for collecting grass clippings comprising:
    a lawn mower including a cutting blade mounted for rotation on a vertical shaft, said cutting blade being adapted for severing the grass clippings;
    a motor being operatively attached to said lawn mower and being adapted to impart rotation to said cutting blade;
    a discharge opening being provided at the rear of the lawn mower and being disposed in a tangential direction to the rotation of said cutting blade, said discharge opening being defined by predetermined width and height dimensions;
    a conveyor member being positioned adjacent to said discharge opening of said lawn mower to receive and convey the grass clippings to a catcher disposed behind said conveyor member and positioned to receive grass clippings therefrom;
    said conveyor member including at least one endless conveyor belt having cross ribs extending across the width dimension thereof to continuously convey said grass clippings to said catcher and said conveyor belt extending across substantially the entire predetermined width dimension of said discharge opening; and
    flexible transmission means operatively connected to said motor to impart rotation to said conveyor member, wherein rotation of said motor imparts rotation to said cutting blade and said conveyor belt which operate in cooperation with each other to sever and convey grass clippings to said catcher.

2. An apparatus for collecting grass clippings comprising:
    a lawn mower including a cutting blade mounted for rotation on a vertical shaft, said ciutting blade being adapted for severing the grass clippings;

a motor being operatively attached to said lawn mower and being adapted to impart rotation to said cutting blade;

a discharge opening being provided at one side of the lawn mower and being disposed in a tangential direction to the rotation of said cutting blade, said discharge opening being defined by predetermined width and height dimensions;

a conveyor member being positioned adjacent to said discharge opening of said lawn mower to receive and convey the grass clippings to a catcher disposed behind said conveyor member and positioned to receive grass clippings therefrom;

said conveyor member including at least one endless conveyor belt having cross ribs extending across the width dimension thereof to continuously convey said grass clippings to said catcher and said conveyor belt extending across substantially the entire predetermined width dimension of said discharge opening; and flexible transmission means operatively connected to said motor to impart rotation to said conveyor member, wherein rotation of said motor imparts rotation to said cutting blade and said conveyor belt which operate in cooperation with each other to sever and convey grass clippings to said catcher.

3. An apparatus for collecting grass clippings comprising:

a lawn mower including a cutting blade mounted for rotation on a vertical shaft, said cutting blade being adapted for severing the grass clippings;

a motor being operatively attached to said lawn mower and being adapted to impart rotation to said cutting blade;

a discharge opening being provided at the rear of the lawn mower and being disposed in a tangential direction to the rotation of said cutting blade, said discharge opening being defined by a predetermined width and height dimensions;

a conveyor member being positioned adjacent to said discharge opening of said lawn mower to receive and convey the grass clippings to a catcher disposed behind said conveyor member and positioned to receive grass clippings therefrom;

said conveyor member including at least one endless conveyor belt having cross ribs extending across the width dimension thereof to continuously convey said grass clippings to said catcher and said conveyor belt extending across substantially the entire predetermined width dimension of said discharge opening; and an additional motor means for imparting rotation to said conveyor member, wherein rotation of said motor imparts rotation to said cutting blade and rotation of said additional motor means imparts rotation to said conveyor belt which operate in cooperation with each other to sever and convey grass clippings to said catcher.

4. An apparatus as set forth in claim 1, 2 or 3, wherein said conveyor member is detachably mounted to the discharge opening of the lawn mower.

5. An apparatus as set forth in claim 1, 2 or 3, wherein said conveyor member is operatively connected to a drive means of said lawn mower by means of a flexible transmission rod so that the conveyor member is operated together with the cutting blade of the lawn mower.

6. An apparatus as set forth in claim 1 or 2, wherein said conveyor member is operatively connected to a drive means of the lawn mower by means of a transmission belt so that the conveyor member is operated together with the cutting blade of the lawn mower.

7. An apparatus as set forth in claim 1, 2 or 3, wherein said endless conveyor belt being rotatably supported by a drive shaft and a support shaft which are spaced relative to each other, said endless belt, drive shaft and support shaft all being positioned within a support frame.

8. An apparatus as set forth in claim 1, 2 or 3, wherein said conveyor member is positioned with a slight space between the discharge opening of the lawn mower and the conveyor member.

9. An apparatus as set forth in claim 1, wherein said conveyor member comprises two conveyor belts disposed substantially parallel relative to each other.

10. An apparatus as set forth in claim 1, 2 or 3, wherein said catcher is detachably mounted to the lawn mower independently from the conveyor member.

11. An apparatus as set forth in claim 10, wherein said catcher is a container having a bottom and sidewalls and including an open top.

12. An apparatus as set forth in claim 10, wherein said catcher is a container having a bottom and sidewalls and including a cover cap at the top thereof.

13. An apparatus as set forth in claim 10, wherein said catcher is made of a flexible material.

14. An apparatus as set forth in claim 10, wherein said catcher is provided with rollers on a bottom portion thereof.

15. An apparatus as set forth in claim 11, wherein said catcher is disposable together with the grass clippings positioned therein.

* * * * *